United States Patent
Close et al.

(10) Patent No.: US 7,172,352 B2
(45) Date of Patent: Feb. 6, 2007

(54) BEARING

(75) Inventors: Shawn Close, Portland, OR (US); Mark C. Riehl, Washougal, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 59 days.

(21) Appl. No.: 10/730,780

(22) Filed: Dec. 9, 2003

(65) Prior Publication Data

US 2005/0123337 A1    Jun. 9, 2005

(51) Int. Cl.
    *B41J 11/58* (2006.01)

(52) U.S. Cl. .................. 400/625; 400/624; 271/145; 384/428; 384/192

(58) Field of Classification Search ............... 400/625; 271/109, 121, 161; 384/428, 192
    See application file for complete search history.

(56) References Cited

U.S. PATENT DOCUMENTS

| | | | |
|---|---|---|---|
| 3,627,389 A | 12/1971 | Foote | |
| 3,765,733 A | 10/1973 | Hackman | |
| 4,594,009 A | 6/1986 | Gutris | |
| 4,669,327 A * | 6/1987 | Aratsu | 74/409 |
| 4,765,757 A | 8/1988 | Harti | |
| 4,796,878 A * | 1/1989 | Nichelson et al. | 271/10.16 |
| 4,840,498 A | 6/1989 | Lichtfuss | |
| 5,360,274 A * | 11/1994 | Strobl | 384/192 |
| 5,447,376 A * | 9/1995 | Cunningham et al. | 384/192 |
| 5,655,762 A * | 8/1997 | Yergenson | 271/121 |
| 5,669,717 A | 9/1997 | Kostrzewsky | |
| 5,809,610 A * | 9/1998 | Eustache | 15/250.21 |
| 5,971,621 A | 10/1999 | Oyafuso et al. | |
| 5,993,065 A | 11/1999 | Ladzinski et al. | |
| 6,004,037 A | 12/1999 | Harris et al. | |
| 6,520,682 B2 | 2/2003 | Kletzli et al. | |
| 2002/0168122 A1 | 11/2002 | Kletzli et al. | |
| 2003/0095729 A1 | 5/2003 | Post | |

FOREIGN PATENT DOCUMENTS

JP                403103614     *   4/1991

* cited by examiner

*Primary Examiner*—Daniel J. Colilla
*Assistant Examiner*—Marissa Ferguson-Samreth

(57) ABSTRACT

In one embodiment, a bearing comprises a cylindrical bearing surface supporting a spherical journal surface. In another embodiment, a device comprises a shaft having a spherical journal surface supported inside and rotatable against a cylindrical bearing surface. In another embodiment, a sheet media feed mechanism comprises: a chassis; a motor mounted to the chassis; a rotatable shaft operatively coupled to the motor; a roller affixed to the shaft; an idler disposed opposite the roller; the idler and the roller engagable with one another to form a nip therebetween; bearings mounted to the chassis and supporting the shaft, each bearing having a cylindrical inner bearing surface; and the shaft having a spherical journal surface inside and rotatable against each bearing surface.

6 Claims, 9 Drawing Sheets

BEARING

BACKGROUND

In many printers, paper or other print media is fed into the printer with rollers mounted to one or more rotating shafts. These shafts are usually supported on each end with a cylindrical journal bearing. In a journal bearing, the stationary supporting part is called the "bearing" and that portion of the shaft directly supported the bearing is called the "journal." In a cylindrical journal bearing, the bearing and the journal are both cylindrical—a cylindrical journal on the shaft fits into a cylindrical opening in the bearing. Very small clearances between the shaft journals and the support bearings are necessary to maintain the accurate paper feed required for good image quality. At the same time, the torque required to turn the shaft must remain low to prevent the paper feed motor from overheating or stalling during higher speed printing. With a conventional cylindrical journal bearing, the small clearances between the journals and the bearings means the journal bearings at each end of the shaft must be closely aligned to prevent the shaft journals from binding inside the bearings and increasing the motor torque needed to turn the shaft. Achieving good bearing alignment is very difficult, however, especially when the bearings at each end of the shaft are mounted to separate components in the printer.

DRAWINGS

Figure 7:
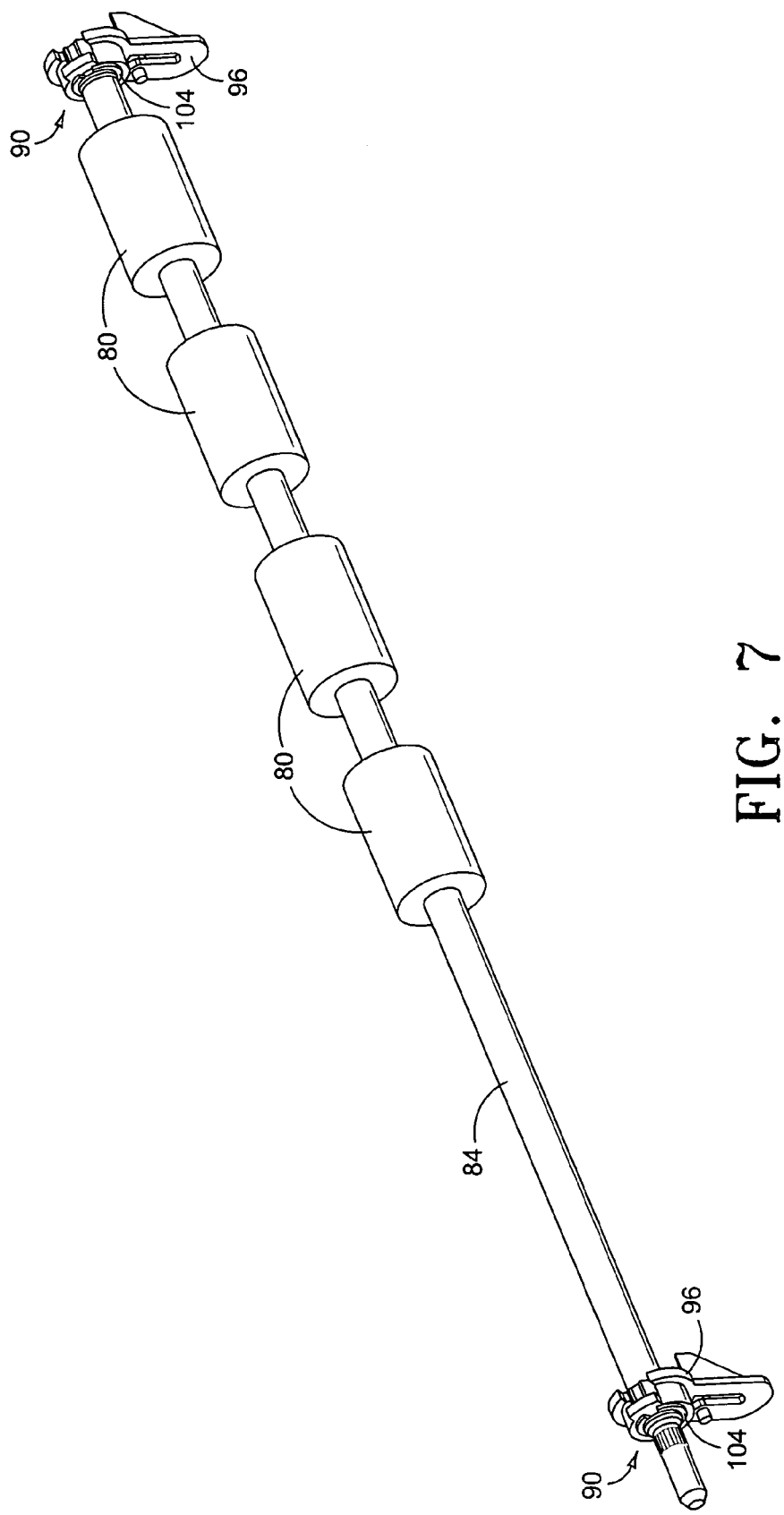
FIG. 7 is a perspective view of the media sheet output shaft in the printer of FIG. 4 supported on journal bearings constructed according to one embodiment of the invention.
Figure 8:
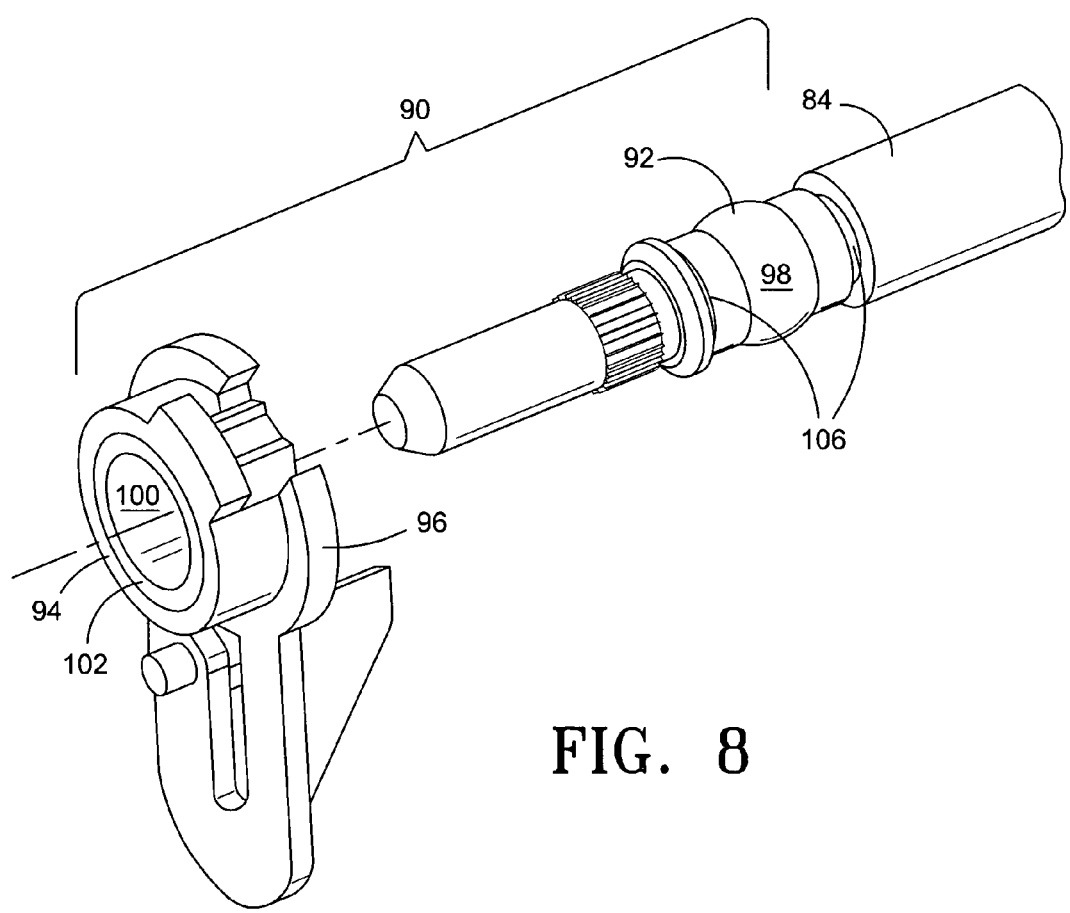
FIG. 8 is an exploded perspective view of one end of the shaft of FIG. 7 showing in detail one of the journal bearings supporting the shaft.
Figure 9:
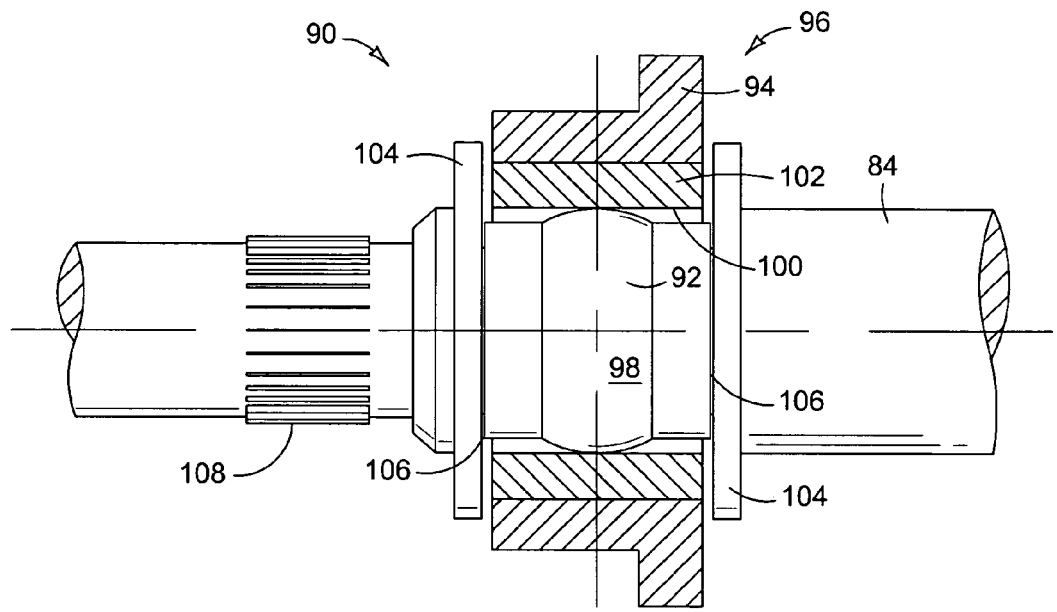
Figure 10:
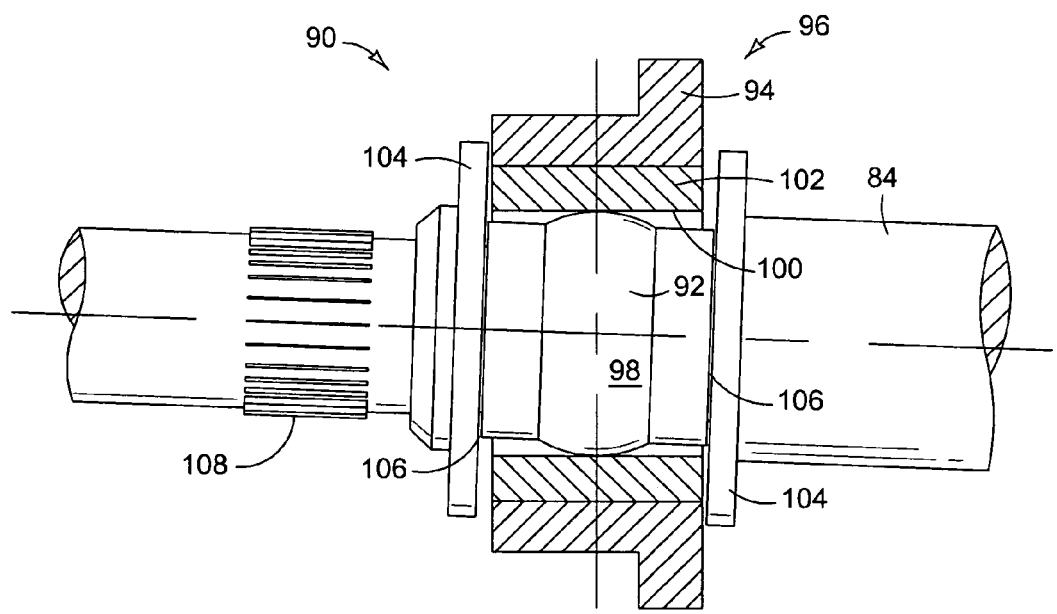

FIGS. 9 and 10 are detail partial section views of one end of the shaft of FIG. 7. The shaft is aligned in FIG. 9. The shaft is misaligned in FIG. 10.

DESCRIPTION

Embodiments of the invention were developed in an effort to reduce the adverse effects of misalignment in the bearings supporting printer media feed shafts while still maintaining the tight clearances needed for good image quality. Embodiments of the invention are directed to a bearing of the type commonly referred to as a journal bearing. In a journal bearing, the stationary supporting part is called the "bearing" and that portion of a moving part directly supported by the bearing is called the "journal." The surfaces of each of these parts that move against one another are called the "bearing surface" and the "journal surface", respectively.

Figure 1:
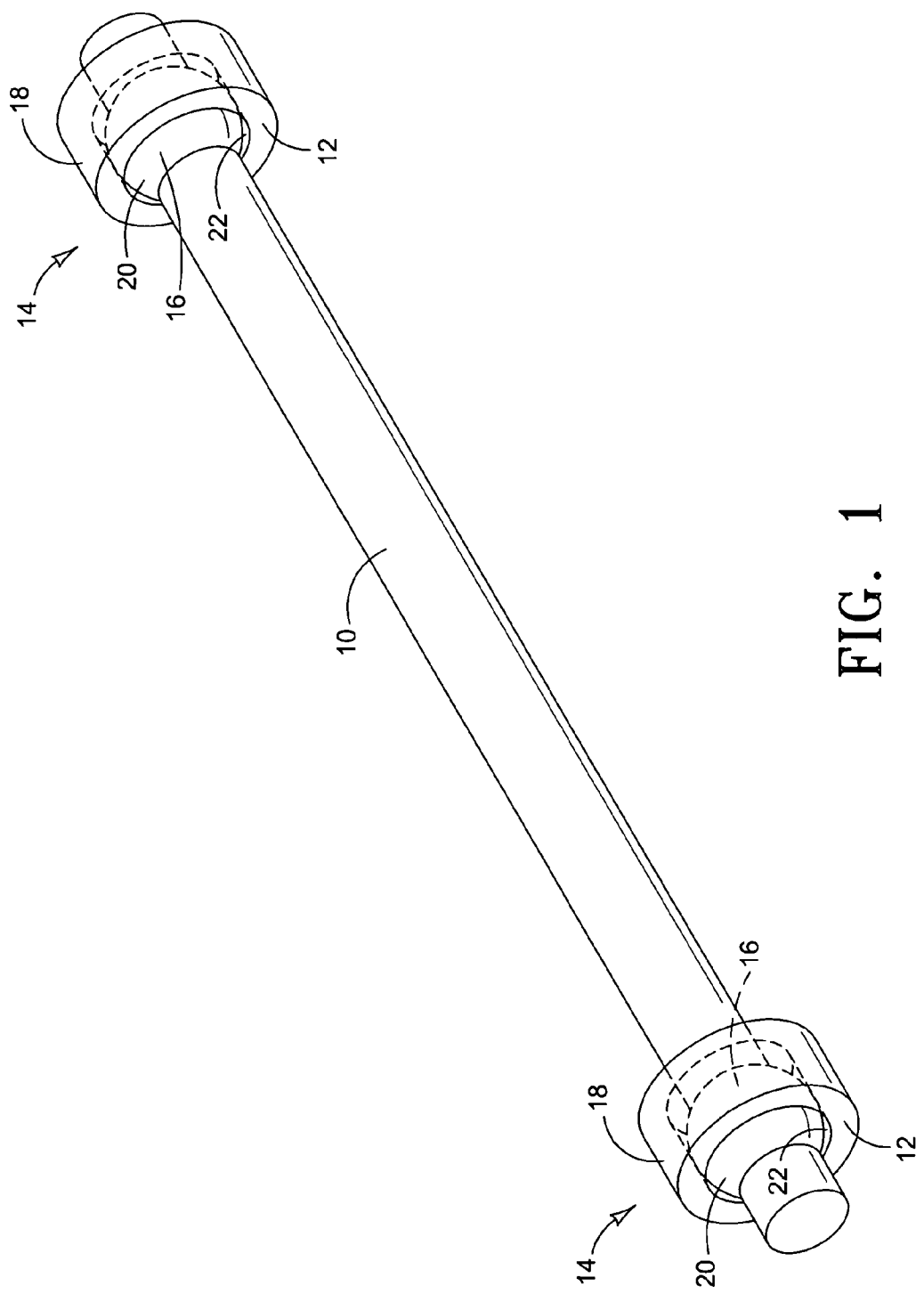
FIG. 1 is a perspective view of a shaft supported on journal bearings according to one embodiment of the invention.
Figure 2:
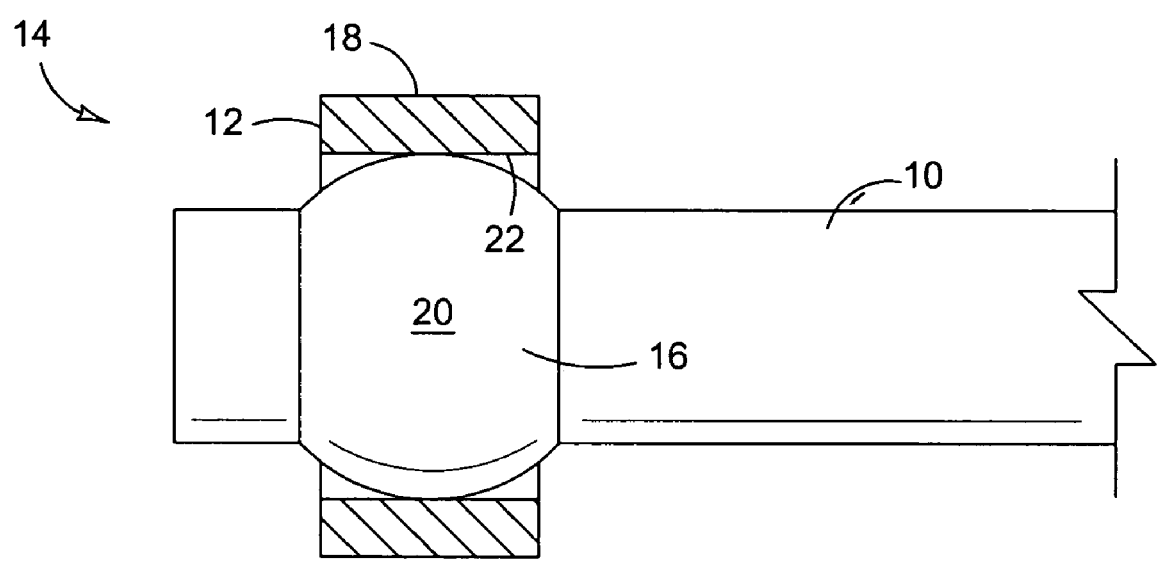
FIG. 2 is a partial section view of the bearings shown in FIG. 1.

FIG. 1 is a perspective view of a shaft 10 supported at each end inside a cylinder 12 with journal bearings 14 constructed according to one embodiment of the invention. FIG. 2 is a partial section view of a journal bearing 14. Referring to FIGS. 1 and 2, shaft 10 is supported inside cylinders 12 on spherical journals 16 that protrude from shaft 10. That portion of each cylinder 12 immediately adjacent to each journal 16 forms the bearings 18 for journals 16. Each journal bearing 14 includes a journal 16 and supporting bearing 18. Each journal 16 includes a spherical journal surface 20 that rotates against a cylindrical bearing surface 22 on each bearing 18.

Figure 4:
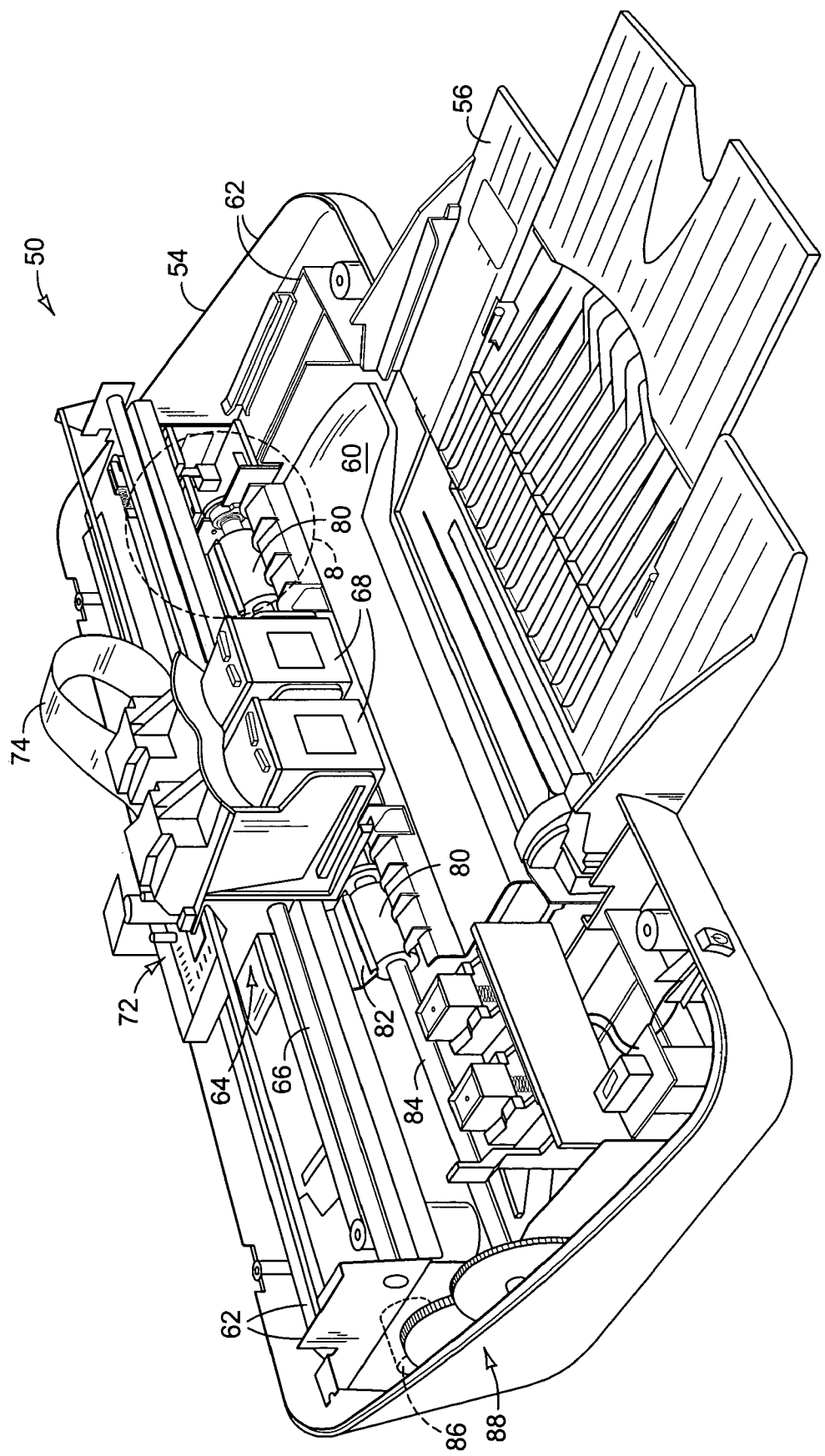
FIG. 4 is a perspective view of an inkjet printer such as the one shown in FIG. 3 with the cover and other parts of the housing removed.
Figure 5:
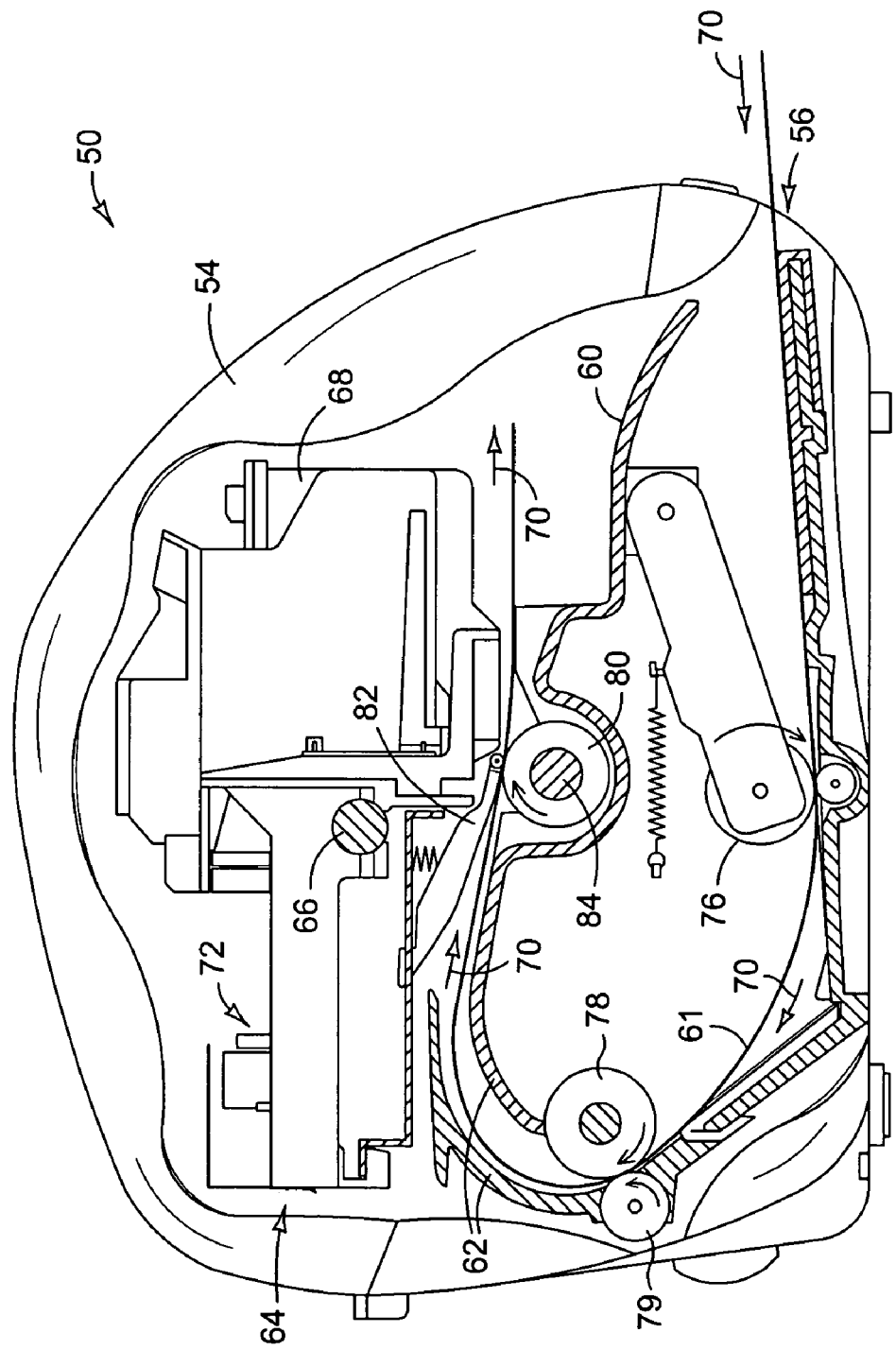
FIG. 5 is a side elevation and partial section view of the inkjet printer of FIG. 3.

One exemplary application for embodiments of the invention will now be described with reference to a media feed roller shaft in the inkjet printer shown in FIGS. 3–5. Embodiments of the new journal bearings, which use a spherical journal in a cylindrical bearing, allow the feed roller shaft to rotate freely in all directions without binding inside the bearing. This freedom of movement makes alignment between the bearings much less important for maintaining low motor torque. The clearance between the journal and bearing surfaces can be tight without significantly increasing the risk of binding.

The contact between the journal and bearing surfaces in embodiments of the new journal bearings is smaller than that of conventional journal bearings. In a conventional journal bearing, the theoretical contact between the journal and bearing surfaces lies along a curved plane (along a line when the bearing is viewed in longitudinal section). In embodiments of the new journal bearings, the theoretical contact between the journal and bearing surfaces lies along a curved line (at a point when the bearing is viewed in longitudinal section). The pressure on the bearing at the contact area can be much higher in embodiments of the new bearings than the pressure in a conventional bearing under the same load. Exceptional freedom of movement, therefore, means higher contact pressures. It has been discovered, however, that higher contact pressures in a journal bearing can be tolerated in print media feed applications due to the light loading on the bearings. (Because it is not usually practicable to fabricate ideal bearing surfaces, the actual contact between the journal and bearing surfaces may be less than the theoretical contact. Nevertheless, the theoretical contact is used to describe the contact between the two surfaces because it would be virtually impossible to determine the actual contact of a non-ideal journal surface rotating against a non-ideal bearing surface.)

Figure 3:
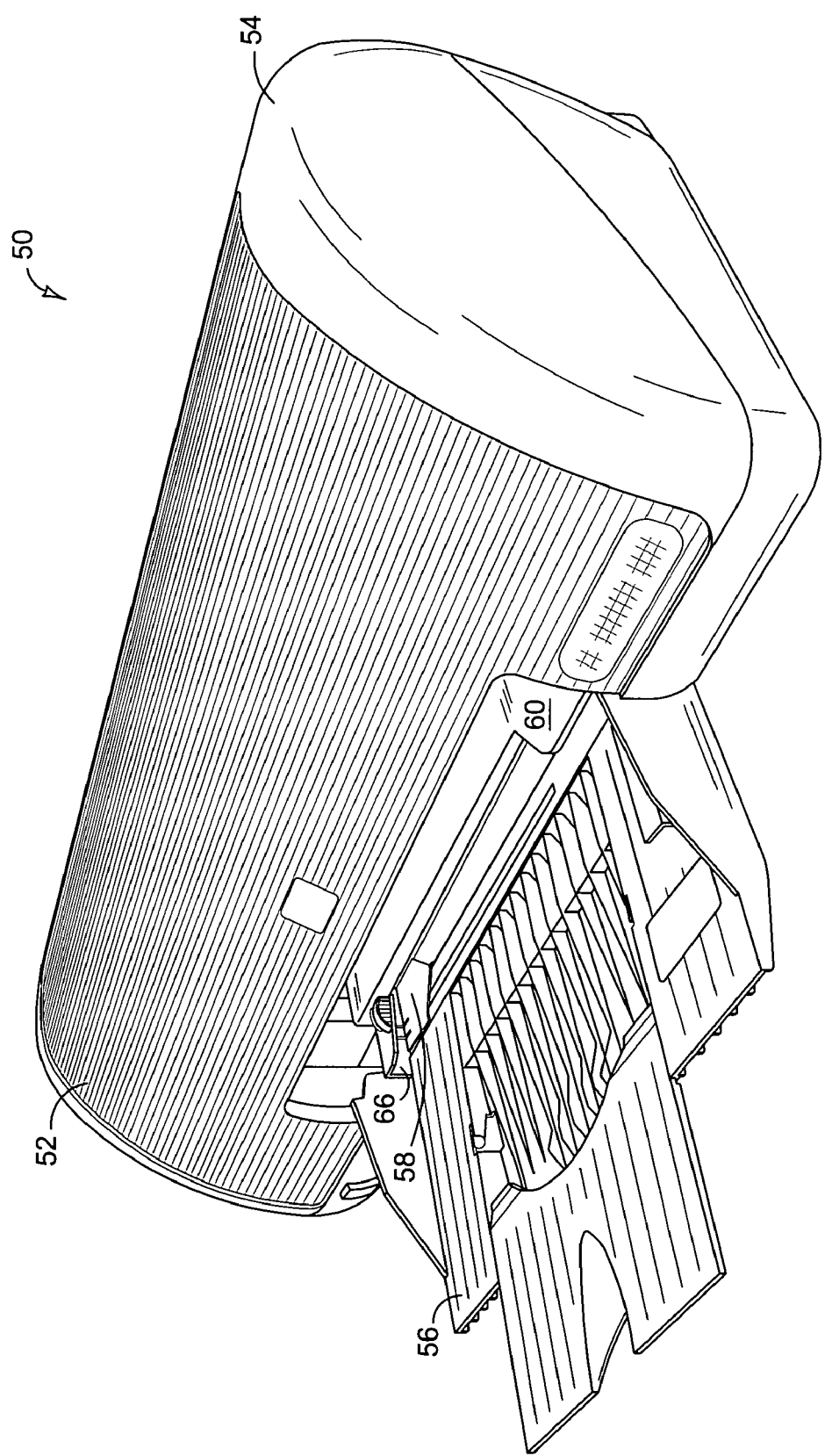
FIG. 3 is a perspective view of the outside of an inkjet printer.

FIG. 3 illustrates an inkjet printer 50. FIG. 4 shows inkjet printer 50 with cover 52 and other parts of housing 54 removed. FIG. 5 is a side elevation and partial section view of inkjet printer 50. Referring to FIGS. 3–5, printer 50 includes a cover 52 and a housing 54. A sheet media tray 56 is positioned at the bottom of printer 50 along an opening 58 in housing 54. Paper or other print media sheets 61 are stacked in tray 56 for input to printer 50 and printed sheets are output back through opening 58 over tray 56. A supporting surface 60 helps suspend the trailing edge of the printed sheets over tray 56.

Printer 50 includes a chassis 62 that supports the operative components of printer 50. Chassis 62 represents generally those parts of housing 54 along with other structurally stable elements in printer 50 that support the operative components of printer 50. A printhead carriage 64 is driven back and forth along a guide rail 66 mounted to chassis 62. Any suitable drive mechanism may be used to move carriage 64.

A reversing motor (not shown) coupled to carriage 64 through a belt and pulley system (not shown), for example, is one carriage drive mechanism commonly used in inkjet printers.

Carriage 64 has stalls for holding one or more printheads 68. In the printer shown in FIGS. 3–5, carriage 64 carries two printheads 68—one printhead containing color ink for color printing and one printhead containing black ink for monochrome printing. Printheads 68 are also commonly referred to as print cartridges or ink cartridges. As best seen in FIG. 5, printheads 68 are positioned along a media path 70 such that each sheet of print media 61 passes directly under printheads 68. The bottom of each printhead 68, which faces media sheet 61, includes an array of nozzles through which drops of ink are ejected onto media sheet 61.

An electronic printer controller 72 receives print data from a computer, scanner, digital camera or other image generating device. Controller 72 controls the movement of carriage 64 back and forth across media sheet 61 and the advance of media sheet 61 along media path 70. Printer controller 72 is also electrically connected to printheads 68 through, for example, a flexible ribbon cable 74. As carriage 64 carries printheads 68 across media sheet 61, printer controller 72 selectively activates ink ejection elements in printheads 68 according to the print data to eject ink drops through the nozzles onto media sheet 61. By combining the movement of carriage 64 across media sheet 61 with the movement of sheet 61 along media path 70, controller 72 causes printheads 68 to eject ink onto media sheet 61 to form the desired print image.

A top sheet 61 is "picked" from a stack of media sheets in tray 56 and fed along media path 70. When a sheet is needed for printing, pick roller 76 is driven clockwise at the direction of controller 72 to grab top sheet 61 and feed it along media path 70 toward transport rollers 78. Transport rollers 78 bear against idler rollers 79 to form a nip that moves sheet 61 along toward output rollers 80. Output rollers 80 bear against idler arms 82 to form a nip that moves sheet 61 onto sheet output supporting surface 60. Output rollers 80 are mounted on a shaft 84. Output rollers shaft 84 is mounted at each end to chassis 62. Output rollers shaft 84 is driven by a motor 86 through a gear train 88.

Figure 6:
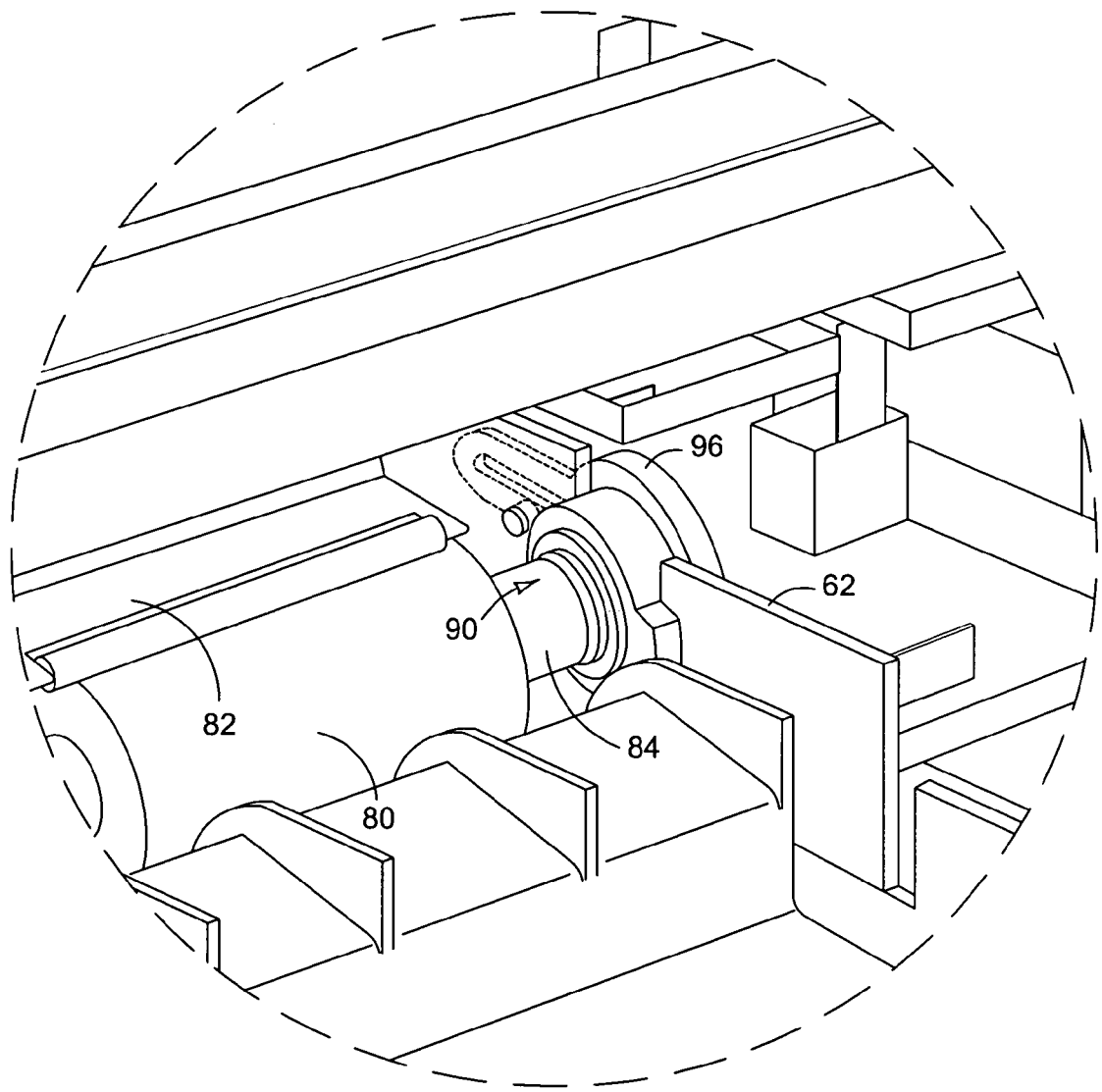
FIG. 6 is a detail perspective view showing a connection between the media sheet output shaft and the chassis in the printer of FIG. 4.

One of the connections between output rollers shaft 84 and chassis 62 is shown in detail in FIG. 6. Output rollers shaft 84 is shown in detail in FIG. 7. The journal bearings 90 and other components used to support the ends of shaft 84 in chassis 62 are shown in detail in FIGS. 8–10. Shaft 84 is aligned in FIG. 9 and misaligned in FIG. 10. Referring to FIGS. 6–10, each journal bearing 90 includes a spherical journal 92 integral with or affixed to shaft 84 and a bearing 94 integral with or affixed to a mounting part 96. Mounting part 96 is sized and shaped to form or hold bearing 94 while mounting securely into chassis 62. Each journal 92 includes a spherical journal surface 98 that rotates against a cylindrical bearing surface 100 on each bearing 90. In the embodiment shown in FIG. 6–10, bearing surface 100 is defined by the inside surface of a cylindrical bushing 102 pressed or over molded into bearing 94. E-clips 104 pushed into grooves 106 on shaft 84, or another suitable retainer, hold bearings 90 in position on shaft 84. Splines 108 on one end of shaft 84 provide an operative connection between shaft 84 and gear train 88 (FIG. 4). Forming bearing surface 100 in a bushing 102 discrete from the rest of bearing 90 and mounting part 96 allows the use of dissimilar materials for these parts. For example, where the characteristics of the bearing surface/journal surface interface require a comparatively tough, wear resistant material, bearing surface 100 can be formed in a bushing 102 and the rest of bearing 94 and mounting part 96 formed from a softer less expensive material.

Carriage 64 and printheads 68 along with other hardware components necessary to deliver ink to the print media are referred to collectively as a print engine. For laser printers or other image forming devices, the print engine will include those components needed to deliver toner or another marking material to the print media. Rollers 76, 78 and 80 along with other hardware components necessary to transport the print media through printer 50 are referred to collectively as a media feed mechanism. Controller 72 includes the programming, processor and associated memory and electronic circuitry necessary to control the print engine, the feed mechanism, and the other operative components of printer 50.

The exemplary embodiments shown in the figures and described above illustrate but do not limit the invention. Other forms, details, and embodiments may be made and implemented. For example, embodiments of the invention are not limited to use in inkjet printers or even printers or printer media feed mechanisms, but may be use in many other devices and mechanisms. Hence, the foregoing description should not be construed to limit the spirit and scope of the invention, which is defined in the following claims.

What is claimed is:

1. A sheet media feed mechanism, comprising:
    a chassis;
    a motor mounted to the chassis;
    a rotatable shaft operatively coupled to the motor;
    a roller affixed to the shaft;
    an idler disposed opposite the roller, the idler and the roller engagable with one another to form a nip therebetween;
    bearings mounted to the chassis and supporting the shaft, each bearing having a cylindrical inner bearing surface; and
    the shaft having a spherical journal surface inside and rotatable against each bearing surface.

2. The mechanism of claim 1, wherein each bearing includes a bushing defining the bearing surface and a body holding the bushing.

3. The mechanism of claim 2, wherein each bushing is pressed or over-molded into the body of the bearing.

4. The mechanism of claim 3, further comprising a part mounting each of the bearings to the chassis.

5. The mechanism of claim 3, further comprising a part mounting each of the bearings to the chassis and the body of each bearing is integral with the mounting part.

6. A printer, comprising:
    a chassis;
    a print engine;
    a feed mechanism operative to move media sheets along a media path through the print engine;
    a printer controller configured to control the operation of the print engine and the feed mechanism; and
    the feed mechanism including
        a motor mounted to the chassis,
        a rotatable shaft operatively coupled to the motor,
        a roller affixed to the shaft,
        an idler disposed opposite the roller, the idler and the roller engagable with one another to form a nip therebetween,
        bearings mounted to the chassis and supporting the shaft, each bearing having a cylindrical inner bearing surface, and
        the shaft having a spherical journal surface inside and rotatable against each bearing surface.

* * * * *